US006801768B2

(12) United States Patent
Gleyzes et al.

(10) Patent No.: US 6,801,768 B2
(45) Date of Patent: Oct. 5, 2004

(54) MULTIMEDIA TWO-WAY COMMUNICATION TERMINAL

(75) Inventors: Yves-Paul Gleyzes, Toulouse (FR); Christian Sirmain, Vieille-Toulouse (FR)

(73) Assignee: Centre National d'Etudes Spatiales, Paris Cedex (FR)

( * ) Notice: Subject to any disclaimer, the term of this patent is extended or adjusted under 35 U.S.C. 154(b) by 93 days.

(21) Appl. No.: 09/986,610

(22) Filed: Nov. 9, 2001

(65) Prior Publication Data

US 2002/0028654 A1 Mar. 7, 2002

Related U.S. Application Data

(63) Continuation of application No. PCT/FR00/01256, filed on May 10, 2000.

(30) Foreign Application Priority Data

May 10, 1999 (FR) .......................................... 99 05921

(51) Int. Cl.[7] .............................................. H04Q 7/20
(52) U.S. Cl. ........................ 455/430; 455/428; 455/427
(58) Field of Search .......................... 455/25, 12.1, 19, 455/3.02, 13.1, 562, 427, 428, 129, 121, 194.1, 550, 1, 430, 13.2, 13.3; 342/359, 352, 422, 374, 56, 74, 75–77, 357; 343/757, 781, 839, 840, 779, 870, 765; 370/320, 321

(56) References Cited

U.S. PATENT DOCUMENTS

| 4,979,170 A | * | 12/1990 | Gilhousen et al. ....... 370/104.1 |
| 5,089,824 A | * | 2/1992 | Uematsu et al. ............ 342/359 |
| 5,347,286 A | | 9/1994 | Babitch ...................... 342/359 |
| 5,666,646 A | * | 9/1997 | McCollum et al. ............. 455/8 |
| 6,020,845 A | * | 2/2000 | Weinberg et al. ........... 342/354 |
| 6,078,286 A | * | 6/2000 | Gonzales et al. ........... 342/359 |
| 6,128,488 A | * | 10/2000 | Sauvageot et al. .......... 455/428 |
| 6,226,494 B1 | * | 5/2001 | Lundstrom et al. ........ 455/13.1 |
| 6,262,689 B1 | * | 7/2001 | Yamamoto et al. ......... 343/781 |
| 6,314,269 B1 | * | 11/2001 | Hart et al. ................. 455/12.1 |
| 6,352,222 B1 | * | 3/2002 | Maeda et al. ........... 244/158 R |

FOREIGN PATENT DOCUMENTS

| EP | 0 720 308 | | 7/1996 | |
| EP | 0 749 217 | | 12/1996 | |
| FR | 2 762 935 | | 11/1998 | |
| WO | 98/49745 | | 11/1998 | |
| WO | WO 98/49745 | * | 11/1998 | ............ H04Q/3/02 |
| WO | WO 98/49746 | * | 11/1998 | ............ H04Q/3/14 |

* cited by examiner

*Primary Examiner*—Edward F. Urban
*Assistant Examiner*—C. Chow
(74) *Attorney, Agent, or Firm*—Jacobson Holman PLLC

(57) ABSTRACT

A bidirectional multimedia communication terminal with two orientable antennas for sending/receiving radio signals conveying multimedia data, electronic signal processors for processing signals received/sent via the antennas, a pointing system for pointing each antenna at a predetermined satellite from a constellation of non-geostationary satellites forming part of a multimedia telecommunication system, and a switching system for selectively switching the transmission of multimedia data between the terminal and the satellites of the constellation from the satellite at which one of the antennas is pointed to the satellite at which the other antenna is pointed. The pointing system includes an antenna orientation unit associated with each antenna and a control unit for controlling the orientation units on the basis of data on the position of the terminal in a frame of reference tied to the Earth and on ephemerides of visible satellites of the constellation.

18 Claims, 2 Drawing Sheets

MULTIMEDIA TWO-WAY COMMUNICATION TERMINAL

This application is a continuation of International PCT Application N° PCT/FR00/01256 filed on May 10, 2000, which designated the United States.

FIELD OF THE INVENTION

The present invention relates to a bidirectional multimedia communication terminal.

DESCRIPTION OF THE PRIOR ART

Transmitting multimedia data, including at the same time sound or voice data, digital data and images, implies using a very wide frequency band and therefore media capable of transmitting such bandwidths. The media used today essentially comprise optical fibers, radio beams and satellites.

The use of optical fibers has the drawback that it is necessary to install a dense terrestrial infrastructure. The use of radio beams suffers from the same disadvantage, plus that relating to the sensitivity of this mode of transmission to interference due to the radio and atmospheric environments, which can degrade the quality of links, and even cut them off.

Geostationary satellites are routinely used at present to transmit multimedia data in the C or Ku band, in conjunction with VSAT terminals using antennas with a wide radio aperture and therefore a small geometrical diameter. There is of course no need to provide the antenna with a satellite tracking system, as the satellite is geostationary, but this advantage is greatly outweighed by the following disadvantages: 1) the satellite must have very high power transmitters to compensate the attenuation of the signals in space (the satellite is approximately 36 000 km from the Earth), and 2) there is a time-delay of more than 2 seconds for data making a return trip between the Earth and the satellite.

The use of non-geostationary satellites in low Earth orbit (at altitudes from 350 to 20 000 km, for example) eliminates or reduces the latter drawback by reducing the time-delay, for example to 100 ms. Nevertheless, in a multimedia application, data must be provided on the ground for tracking the non-geostationary, i.e. moving, satellite to maintain a call, which is interrupted when the satellite pointed at leaves the space in which it is "visible" from the ground.

One solution to this problem is to use a constellation of non-geostationary satellites in low-Earth orbit, instead of a single satellite. With a constellation including several hundred satellites (as in the TELEDESIC project), it is then possible to ensure continuous coverage of a given site by the Individual coverage areas of the satellites of the constellation, which avoids any recourse to means for tracking non-geostationary satellites. However, this kind of solution would not seem to be economically viable, given the cost of manufacturing, launching and maintaining a constellation comprising several hundred satellites.

One specific object of the invention is to provide a multimedia communication terminal adapted to constitute a communication interface between a satellite-based multimedia communication system and devices for receiving and/or sending multimedia data that does not have the drawbacks of the prior art means for achieving this and which in particular enables continuous bidirectional communication at high bit rates with a time-delay imperceptible to users, in the context of an economically viable communication system.

Another object of the invention is to provide a terminal of this kind that is designed to be autonomous, mobile and compact, so that it can be transported and installed easily on any user site.

SUMMARY OF THE INVENTION

The above objects of the invention, together with others that will become apparent on reading the following description, are achieved by a bidirectional multimedia communication terminal including at least two orientable antennas for sending/receiving radio signals conveying multimedia data, electronic signal processor means for processing signals received or to be sent via the antennas, pointing means associated with each antenna for pointing it at a predetermined satellite from a constellation of non-geostationary satellites forming part of a multimedia telecommunication system, and switching means for selectively switching the transmission of multimedia data between the terminal and the satellites of the constellation from the satellite at which one of the antennas is pointed to the satellite at which the other antenna is pointed, so as to guarantee continuous transmission of a data stream between the terminal and the constellation, the pointing means including an antenna orientation unit associated with each antenna and control means for controlling the orientation units on the basis of data on the position of the terminal in a frame of reference tied to the Earth and on ephemerides of visible satellites of the constellation supplied by a mission center of the constellation, which terminal further includes a system for delivering the data on the position of the terminal. The positioning system is advantageously connected to the GPS constellation to supply terminal position and time data to the control means. Similarly, the frame of reference tied to the Earth is advantageously defined by a geostationary satellite.

As described in more detail later, the resulting terminal provides a satellite-based multimedia data communication system having the advantageous features stated above.

Other features and advantages of the present invention will become apparent on reading the following description and examining the accompanying drawings.

DETAILED DESCRIPTION OF THE PREFERRED EMBODIMENT

Figure 1:
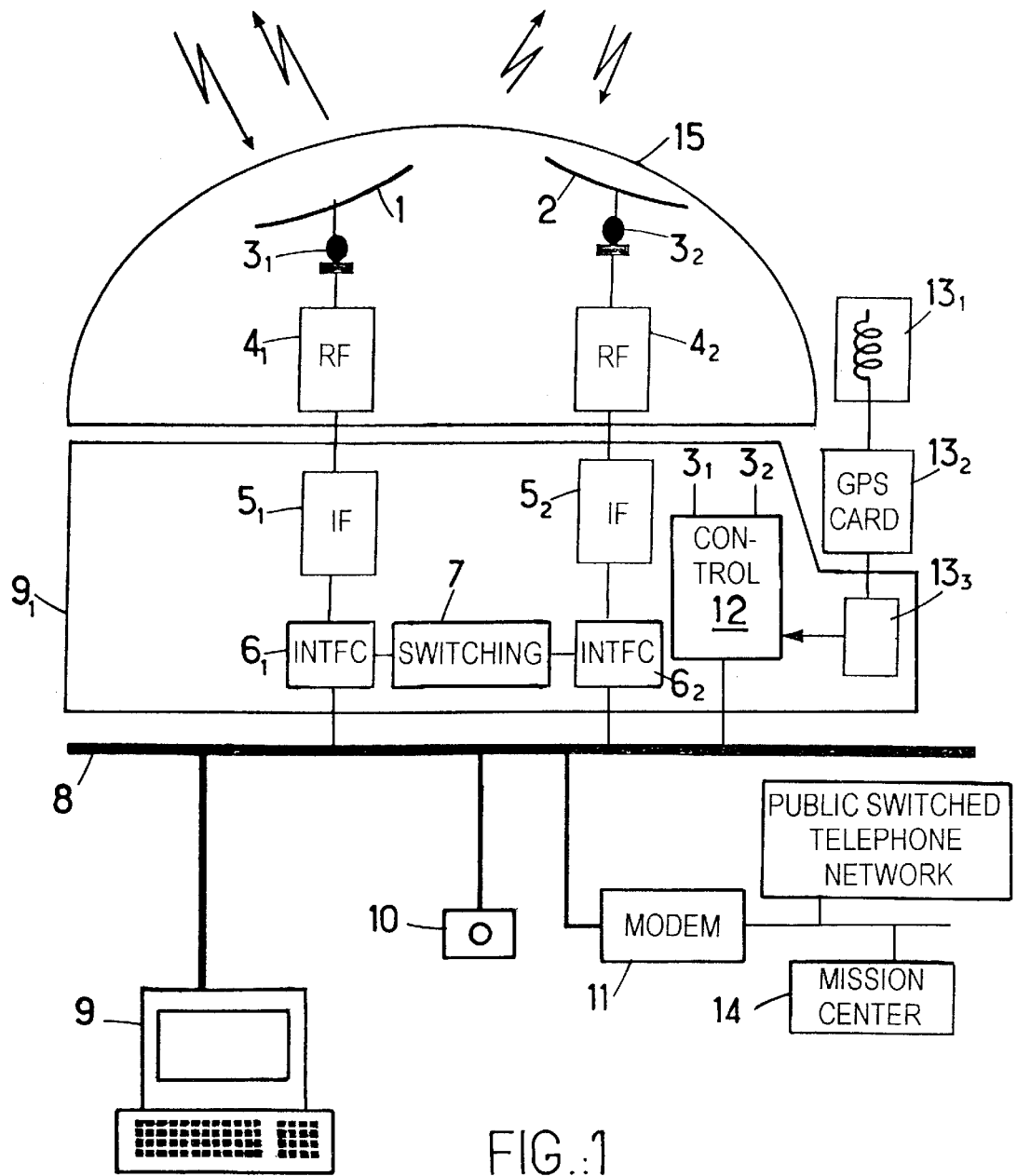
FIG. 1 is a diagrammatic representation of the terminal according to the invention and its connections to peripheral devices.

FIG. 1 of the accompanying drawings shows that the terminal according to the invention has two orientable antennas 1, 2 designed for selectively sending or receiving signals exchanged with non-geostationary satellites (not shown) of a constellation of such satellites forming part of a multimedia data telecommunication system.

Each antenna 1, 2 is mounted on a respective orientation unit $3_1, 3_2$ forming part of means of pointing at a preselected satellite from the constellation of satellites, which are preferably non-geostationary satellites in low Earth orbit, for the reasons explained above, with the aim of making imperceptible the time-delay affecting communications between the terminal and the satellite.

Each antenna 1, 2 is also connected to respective electronic means ($4_1, 5_1, 6_1$) and ($4_2, 5_2, 6_2$) for processing signals received or to be sent. These means are described in more detail hereinafter, with reference to FIG. 2.

The terminal further includes means 7 for selectively switching multimedia data received or sent either via the antenna 1 or via the antenna 2 to a communication bus to which peripheral devices for processing or generating the data are connected. By way of illustrative and non-limiting example only, such devices can include a personal or business computer 9, a videoconference camera 10, and a modem 11 connected, for example, to the public switched telephone network, to the mission center 14 of the constellation, etc.

The orientation units $3_1$, $3_2$ of the antennas are controlled by means 12 fed with data from a positioning system ($13_1$, $13_2$, $13_3$) for locating the terminal in a frame of reference tied to the Earth and data obtained via the modem 11 from the mission center 14 of the constellation of satellites, in particular from ephemerides indicating the orbital parameters of any satellite of the constellation at any time.

The positioning system can be the well known "GPS" system. The terminal then includes an antenna $13_1$ for receiving signals sent by the satellites of the GPS constellation, that is to say signals for locating the terminal and timing signals, the terminal being located, for example, in a frame of reference defined by signals sent by a geostationary satellite and therefore tied to the Earth. The signals are processed on an electronic circuit card $13_2$ and transmitted to an interface $13_3$ for communication with the control means 12.

According to one feature of the present invention, the means 12 know the position of the terminal and also the positions of the satellites of the GPS constellation and can calculate and control the orientation of the antennas 1 and 2 so that each tracks one of the satellites of the constellation present in the space covered by those antennas, the satellites being chosen so that at least one of them is "visible" at any time to one of the antennas 1 and 2. Accordingly, if the control means 12 detect that one of the tracked satellites is leaving the "visible" space when data is being transmitted bidirectionally between the bus 8 and the constellation via that satellite, the switching means 7 receive from the means 12 an instruction to switch the transmission of data to the other antenna, and thus the other satellite, which is still visible to that antenna of the terminal. This ensures continuous transmission of the data stream between the terminal and the constellation, which constitutes one important feature of the present invention.

In practical terms, the terminal according to the invention can take the form of a modular, autonomous and mobile system including, under a radome 15 protecting the antennas 1 and 2, the respective orientation units $3_1$ and $3_2$ of the antennas and a portion $4_1$, $4_2$ of the electronic means associated with the antennas, which are described in more detail later.

An electronic circuit card $9_1$ in the microcomputer 9 includes most of the electronic means ($5_1$, $6_1$; $5_2$, $6_2$) as well as the switching means 7, the control means 12 and the interface $13_3$ with the GPS card $13_2$.

The antennas are advantageously VSAT antennas with a large radio aperture and therefore a small geometrical aperture. In the V, Ka and Ku microwave bands, the geometrical diameter of the antennas can then be small enough for the modular assembly that contains them to have a small overall size, with a largest dimension of the order of 1.50 m, and to be light in weight, weighing approximately ten kilos. This system can then be easily installed on a fixed structure (building) or mobile structure (vehicle).

The electronic means incorporated in the terminal in accordance with the present invention for appropriately conforming the signals that provide bidirectional transmission of multimedia data between the constellation of satellites and the peripheral devices that can be connected to the terminal are described in more detail next with reference to FIG. 2.

Figure 2:
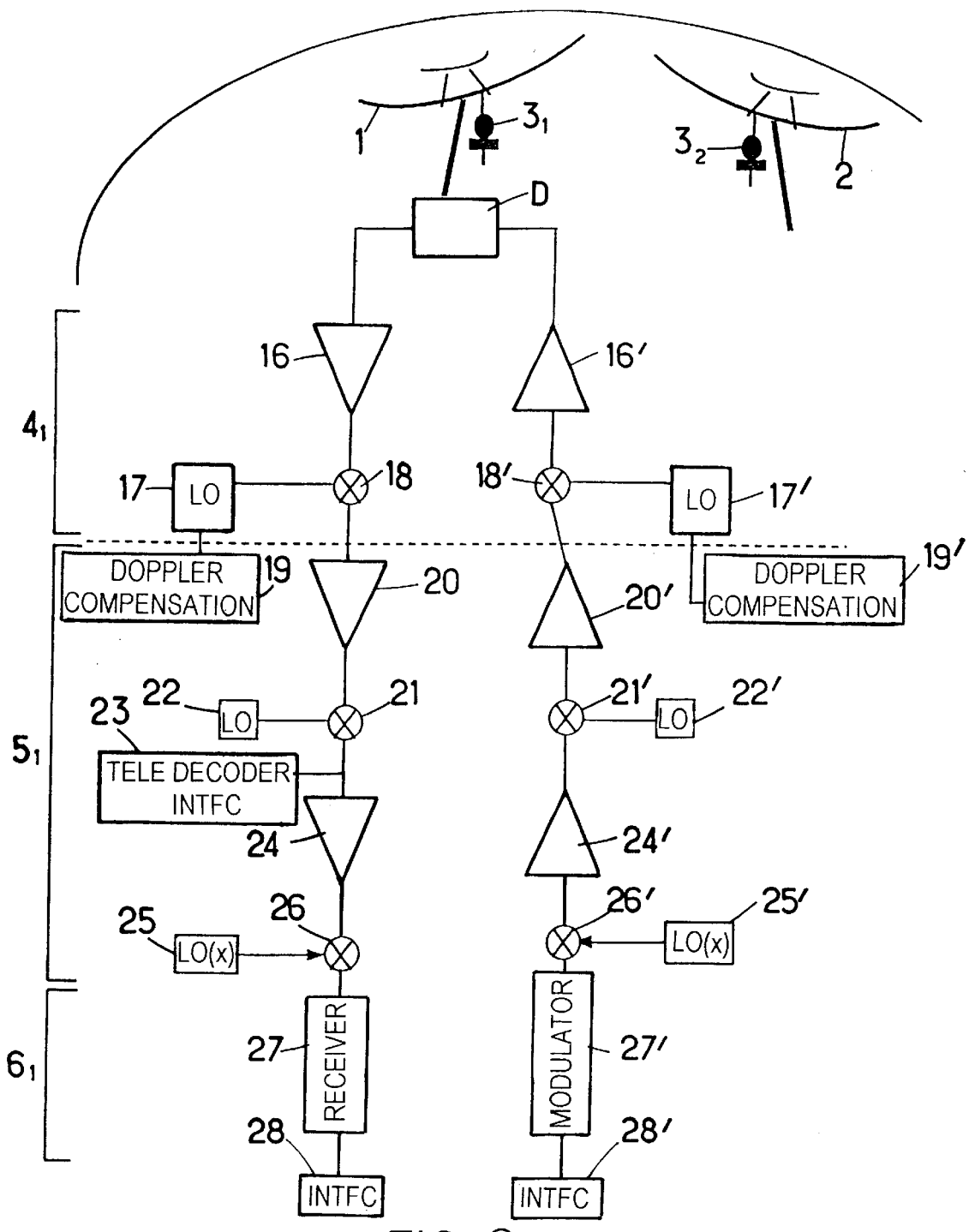
FIG. 2 is a functional block diagram of electronic signal processor means incorporated in the FIG. 1 terminal.

FIG. 2 shows only the electronic means associated with the antenna 1, the means associated with the antenna 2 being identical.

As shown, the electronic means referred to here include two systems, one handling the transmission of multimedia data from the constellation to the terminal and the other handling transmission of such data in the opposite direction.

A duplexer D isolates the sender system from the receiver system or vice versa. For transmission of data from the constellation in the form of modulation of a chosen microwave frequency in the Ka band (20–30 GHz) or the V band (35–40 GHz) compatible with the high bit rate required by multimedia data, the signal received via the antenna first enters the microwave amplifier 16 whose output is fed to a frequency step-down unit consisting of a local oscillator 17 and a mixer 18 in order to transpose the data to be received to a lower intermediate frequency (IF) in the Ku band (12–14 GHz), for example. If necessary, the local oscillator 17 can itself be associated with means 19 for compensating the Doppler effect due to the movement of the satellites pointed at.

For direct reception of data from the constellation in the Ku band, the first amplifier and frequency changer stage must obviously be eliminated.

The output of the mixer 18 feeds a Ku band amplifier 20 whose output frequency is transposed to a frequency in the L band by another mixer 21 associated with a second local oscillator 22. In one application of the terminal according to the invention the output of the mixer 21 feeds an interface 23 associated with a satellite television broadcast decoder.

To receive multimedia data that can be processed by the computer 9, the carrier frequency must be reduced further. To this end, the frequency of the L band signal amplified at 24 is further transposed by means of a mixer 26 and a local oscillator 25, the resulting signal entering a receiver/demodulator 27 in order to be delivered, at a "video" frequency, to an interface (28) for communication with the computer 9, for example, via the bus 8, to set up with the latter a call in accordance with a predetermined protocol, such as the TCP/IP or the FTP, for example.

It is therefore apparent that the electronic signal processor means of the terminal according to the invention include a cascade of frequency generators (the local oscillators) and means for mixing the output frequencies of those generators as a function of the signals received, the generators and the mixing means transposing the frequency of the signal from the Ku, Ka or V band to the L band (for a TV decoder), or to a "video" band for communication with the computer 9, for example.

In the opposite direction, to transmit signals conveying multimedia data to a satellite of the constellation via the antennas 1 and 2, the terminal according to the invention includes an electronic system 16' to 28' made up of units respectively corresponding to the units 16 to 28 of the system described above, but operating in the opposite direction so that the signals are fed to the antenna on a carrier in the Ku, Ka or V band, for example, suited to their propagation within the constellation of satellites.

Thus the system 16' to 28' includes a video interface 28', a modulator 27' for modulating a carrier whose frequency is raised to the frequency to be transmitted in the Ku, Ka or V band by means of frequency step-up units (each consisting of a mixer associated with a local oscillator) such as the units (25', 26'), (22', 21') and (17', 18'), and amplifiers 24', 20' and 16'. The output of the amplifier 16' feeds the antenna 1 via the duplexer D.

It is now apparent that the invention achieves the stated objects, namely providing a multimedia, and therefore high data bit rate, communication terminal providing bidirectional communication with a short time-delay (for example less than 100 ms) thanks to the use of non-geostationary satellites in low Earth orbit (at an altitude from 300 to 20 000 km, for example) and economically enabling the use of a constellation with a small number of satellites thanks to the means provided in the terminal for pointing at the satellites, which means enable each satellite to be tracked throughout the space visible from the terminal.

Terminals of this kind, associated directly with a constellation of satellites of this kind, ensure transmission of data at high bit rates free from the congestion that is noted at present when such data is transmitted, at least in part, via terrestrial transmission networks.

The modular system protected by the radome 15 can be constructed in forms and at prices suitable for consumers or professional users. For the latter, the system can include more than two antennas, for more reliable transmission of signals conveying multimedia data.

Of course, the invention is not limited to the embodiment described and shown, which has been provided only by way of example. Thus the electronic means of the terminal according to the invention could be provided with adjustment means for adapting the same basic terminal to operate in different specific frequency bands. Nor is the terminal according to the invention limited to use in combination with a constellation of non-geostationary satellites. The same terminal could of course exchange data with a geostationary satellite, in which case the antenna could be fixed.

What is claimed is:

1. A bidirectional multimedia communication terminal comprising two orientable antennas for sending/receiving radio signals conveying multimedia data, an electronic signal processor for processing signals received or to be sent via said antennas, a pointing system associated with each antenna for pointing the respective antenna at a predetermined satellite from a constellation of non-geostationary satellites forming part of a multimedia telecommunication system, and a switching system for selectively switching the transmission of multimedia data between the terminal and the satellites of said constellation from a satellite at which one of said antennas is pointed to another satellite at which the other antenna is pointed, so as to guarantee continuous transmission of a data stream between said terminal and said constellation, said pointing system including an antenna orientation unit associated with each antenna and a control unit for controlling said orientation units on the basis of data on the position of said terminal in a frame of reference tied to the Earth and on ephemerides of visible satellites of said constellation supplied by a mission center of said constellation, said terminal further including a terminal positioning system for delivering said data on the position of said terminal.

2. The terminal claimed in claim 1 wherein a GPS constellation supplies terminal position and time data to said control unit.

3. The terminal claimed in claim 1 wherein said frame of reference tied to the Earth is defined by a geostationary satellite.

4. The terminal claimed in claim 1 including connection and interface means with a personal or business computer and with a video camera and/or a modem.

5. The terminal claimed in claim 1 wherein said electronic signal processor includes, for receiving signals sent by a satellite of said constellation, a cascade of frequency step-down devices, a plurality of frequency amplifiers each associated with one of said frequency step-down devices, and a receiver/demodulator for demodulating and communicating signals transmitted in this way.

6. The terminal claimed in claim 5 including means for compensating the Doppler effect on the signals sent or received.

7. The terminal claimed in claim 1 wherein said electronic signal processor includes, for sending signals to a satellite of said constellation, a cascade of frequency step-up devices, a plurality of frequency amplifiers each associated with one of said frequency step-up devices, and a modulator for modulating and communicating signals to be sent.

8. The terminal claimed in claim 1 wherein said antennas are protected by a common radome and the system consisting of said radome, said antennas, said orientation units and part of said electronic signal processor means constitutes an autonomous and mobile system.

9. The terminal claimed in claim 1 wherein said electronic signal processor includes means of adaptation to specific frequency bands.

10. The terminal claimed in claim 1 wherein said terminal positioning system is built into said terminal and includes an antenna for receiving GPS signals sent by satellites of a GPS constellation, an electronic circuit card for processing said GPS signals, and an interface for communication with said control unit.

11. A bidirectional multimedia communication terminal comprising:
    two orientable antennas for sending/receiving radio signals conveying multimedia data;
    an electronic signal processor for processing signals received or to be sent via said antennas;
    an antenna orientation unit associated with each antenna for pointing the respective antenna at a predetermined satellite from a constellation of non-geostationary satellites forming part of a multimedia telecommunication system;
    a control unit for controlling said orientation units on the basis of data on the position of said terminal in a frame of reference tied to the Earth and on ephemerides of visible satellites of said constellation of non-geostationary satellites;
    means for receiving said ephemerides from a mission center and for transmitting them to said control unit;
    a switching system for selectively switching the transmission of multimedia data between the terminal and the satellites of said constellation from a satellite at which one of said antennas is pointed to another satellite at which the other antenna is pointed, so as to guarantee continuous transmission of a data stream between said terminal and said constellation; and
    a terminal positioning system for delivering said data on the position of said terminal, said positioning system being built into said terminal and including an antenna for receiving GPS signals sent by satellites of a GPS constellation, an electronic circuit card for processing said GPS signals, and an interface for communication with said control unit.

12. The terminal claimed in claim 11 wherein said frame of reference tied to the Earth is defined by a geostationary satellite.

13. The terminal claimed in claim 11 including connection and interface means with a personal or business computer and with a video camera and/or a modem.

14. The terminal claimed in claim 11 wherein said electronic signal processor includes, for receiving signals sent by a satellite of said constellation, a cascade of frequency step-down devices, a plurality of frequency amplifiers each associated with one of said frequency step-down devices, and a receiver/demodulator for demodulating and communicating signals transmitted in this way.

15. The terminal claimed in claim 13 including means for compensating the Doppler effect on the signals sent or received.

16. The terminal claimed in claim 11 wherein said electronic signal processor includes, for sending signals to a satellite of said constellation, a cascade of frequency step-up devices, a plurality of frequency amplifiers each associated with one of said frequency step-up devices, and a modulator for modulating and communicating signals to be sent.

17. The terminal claimed in claim 11 wherein said antennas are protected by a common radome.

18. The terminal claimed in claim 11, wherein said electronic signal processor includes means of adaptation to specific frequency bands.

* * * * *